US009449111B2

(12) United States Patent
Champion et al.

(10) Patent No.: US 9,449,111 B2
(45) Date of Patent: Sep. 20, 2016

(54) SYSTEM AND METHOD FOR GENERATING AND ACCESSING TRAILS

(71) Applicant: disruptDev, LLC, Austin, TX (US)

(72) Inventors: Mario M. Champion, Austin, TX (US); Adam Tyler Pugh, Austin, TX (US); Frank M. Champion, Austin, TX (US)

(73) Assignee: disruptDev, LLC, Austin, TX (US)

( * ) Notice: Subject to any disclaimer, the term of this patent is extended or adjusted under 35 U.S.C. 154(b) by 199 days.

(21) Appl. No.: 13/664,838

(22) Filed: Oct. 31, 2012

(65) Prior Publication Data

US 2014/0123075 A1 May 1, 2014

(51) Int. Cl.
*G06F 15/18* (2006.01)
*G06F 17/30* (2006.01)

(52) U.S. Cl.
CPC .............................. *G06F 17/30873* (2013.01)

(58) Field of Classification Search
CPC ...................................................... G06N 5/02
See application file for complete search history.

(56) References Cited

U.S. PATENT DOCUMENTS

| | | | | |
|---|---|---|---|---|
| 7,747,604 | B2 * | 6/2010 | Hawkins | 707/709 |
| 8,051,068 | B2 * | 11/2011 | Reed et al. | 707/716 |
| 8,533,582 | B2 * | 9/2013 | Rao et al. | 715/206 |
| 8,560,549 | B1 * | 10/2013 | Pedersen | G06F 17/3089 707/739 |
| 9,069,769 | B2 * | 6/2015 | Vandervort | G06F 17/30014 |
| 2002/0198882 | A1 * | 12/2002 | Linden et al. | 707/10 |
| 2006/0106847 | A1 * | 5/2006 | Eckardt et al. | 707/101 |
| 2006/0173556 | A1 * | 8/2006 | Rosenberg | 700/3 |
| 2007/0061314 | A1 * | 3/2007 | Rosenberg | 707/3 |
| 2007/0271230 | A1 * | 11/2007 | Hart | G06F 17/30876 |
| 2008/0294626 | A1 * | 11/2008 | Mukherjee | 707/5 |
| 2009/0094199 | A1 * | 4/2009 | Hawkins | 707/3 |
| 2009/0228574 | A1 * | 9/2009 | Maures | 709/219 |
| 2009/0265347 | A1 * | 10/2009 | Reed et al. | 707/6 |
| 2010/0106752 | A1 * | 4/2010 | Eckardt et al. | 707/805 |
| 2010/0241940 | A1 * | 9/2010 | Rao et al. | 715/205 |
| 2011/0093798 | A1 * | 4/2011 | Shahraray et al. | 715/763 |
| 2012/0030193 | A1 * | 2/2012 | Richberg et al. | 707/719 |
| 2014/0118338 | A1 * | 5/2014 | Champion et al. | 345/419 |
| 2014/0122384 | A1 * | 5/2014 | Champion et al. | 706/12 |
| 2014/0122404 | A1 * | 5/2014 | Champion et al. | 706/46 |
| 2014/0123075 | A1 * | 5/2014 | Champion et al. | 715/853 |
| 2014/0164073 | A1 * | 6/2014 | Mosley et al. | 705/7.42 |

OTHER PUBLICATIONS

IP.com, "Storing and Sharin Rated Sequences of Pages to Improve User Experience in Online Documention", May 31, 2011, IP.com, pp. 1-5.*

Yu et al., "Personalized Location-Based Recommendation Services for Tour Planning in Mobile Tourism Applications", 2009, Springer-Verlag Berlin Heidelberg, LNCS 5692, pp. 38-49.*

(Continued)

*Primary Examiner* — Paulinho E Smith
(74) *Attorney, Agent, or Firm* — McGuireWoods LLP

(57) ABSTRACT

A device for generating a trail. The device includes a processor for executing a set of instructions and a memory for storing the set of instructions. The set of instructions are executed to receive user input to create a trail in response to content generated or retrieved by a user, establish a hierarchy for the trail in response to receiving the content, establish characteristics for the multiple nodes including at least shape and color, and generating the trail utilizing the hierarchy and the characteristics and according to user preferences established by the user, the trail includes multiple nodes that are interconnected.

20 Claims, 12 Drawing Sheets

(56) References Cited

OTHER PUBLICATIONS

Romero et al., "Mining and Visualizing Visited Trails in Web-Based Educational Systems", Jun. 21, 2008, Educational Data Minging 2008, pp. 180-186.*

Reinhold, "WikiTrails: Augmenting Wiki Structure for Collaborative, Interdisciplinary Learning", Aug. 23, 2006, WikiSym 2006, pp. 47-57.*

Walker, "Visitor-Constructed Personalized Learning Trails", Apr. 14, 2007, Museums and the Web 2007, pp. 1-11.*

Webopedia (http://webopedia.com/TERM/drag_and_drop.html), Jan. 2010, pp. 1-2.*

IBM, "Fully-Navigable Breadcrumb Trails", Sep. 15, 2002, IP.com, pp. 1-3.*

IP.com, "Infocentre Breadcrumb Trail", Aug. 3, 2011, IP.com, pp. 1-3.*

Kennoy et al., "Personalised Trails and Learner Profiling with E-Learning Environments", Dec. 28, 2004, pp. 1-43.* iSubscribe (website: http://initechnologies.com/saas/index.php?masterId=NzU=%20%20%20&catId=ODk=&superId=NzU=), "iSubscribe—Membership Management, Service Subscription Managment Software", May 11, 2012, pp. 1-2.*

Hardy et al., "Tracking and Visualisation of Student Use of Online Learning Materials in a Large Undergraduate Course", 2008, ICWL 2007, LNCS 4823, pp. 464-474.*

Kevin Walker, "Designing for Meaning Making in Museums—Visitor-Constructed Trails using Mobile Digital Technologies", Oct. 2010, pp. 1-405.*

\* cited by examiner

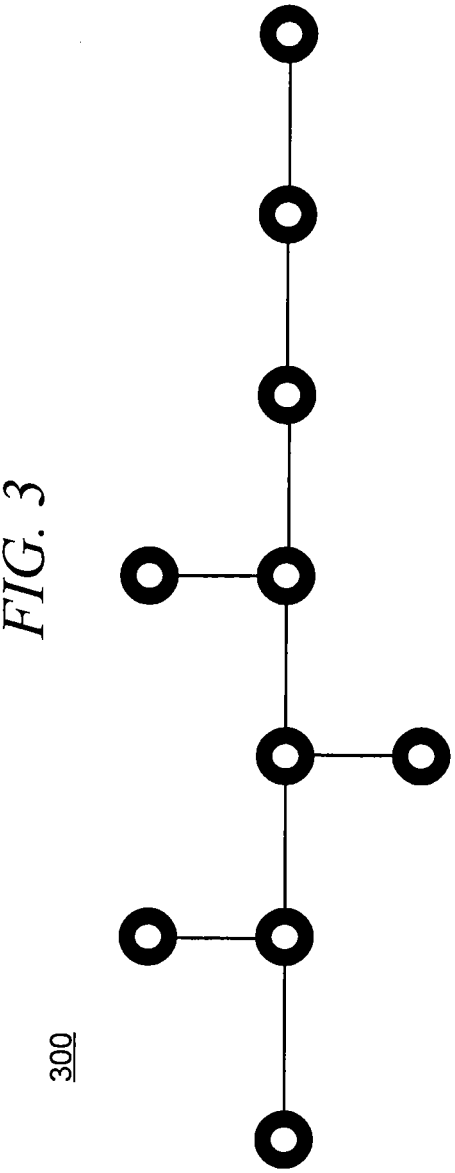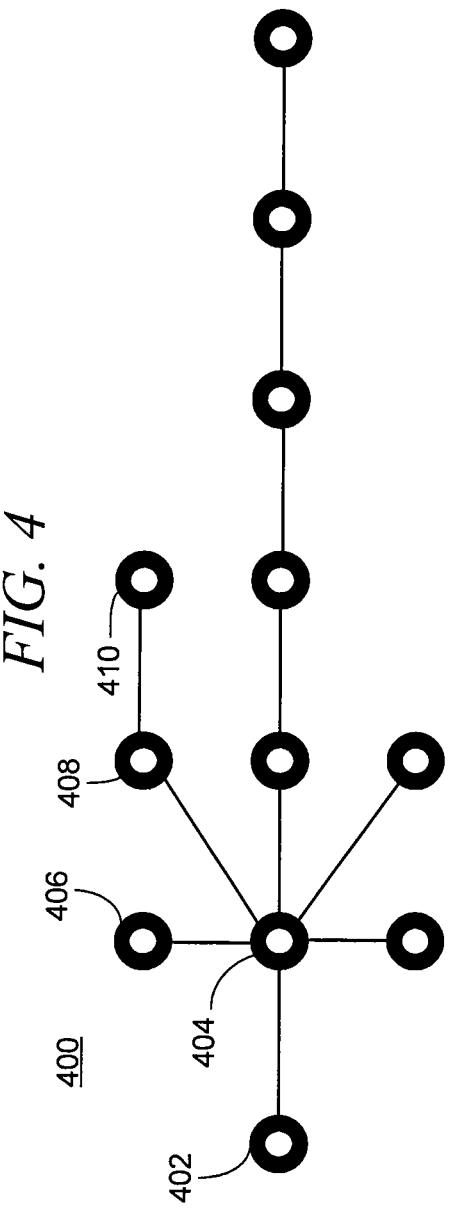

SYSTEM AND METHOD FOR GENERATING AND ACCESSING TRAILS

BACKGROUND

The use of and development of online resources and electronic communications has grown nearly exponentially in recent years. The growth is fueled by larger networks with more reliable protocols and better computing and communications devices available to individuals, users and service providers. As a result, users utilize and rely on online resources more and more to perform tasks, both simple and complex. In many cases, users may perform a single task multiple times or may want to share information with friends, family, or strangers. Existing websites and tools are not focused on duplicating information and processes for users that would like to access the same information.

SUMMARY

One embodiment provides a system, method, and device for visually tracking a learned process. The user input utilized to perform the learned process and a title for the learned processed is received. Nodes are created to represent steps of the learned process in response to the user input. Information for each of the steps is associated with each of the nodes. The nodes are connected in an order for performing the learned process. The connected nodes are visually displayed as a trail for one or more users to perform the learned process. The device may include a processor and a memory for storing a set of instructions to implement the method herein described.

Another embodiment provides a system for visually tracking a learned process. The system may include a client configured to receive user input utilized to perform the learned process. The system may include a server configured to create nodes to represent steps of the learned process in response to the user input, associate information for each of the steps with each of the nodes, connect the nodes in an order for performing the learned process, and visually display the connected nodes as a trail for one or more users to perform the learned process.

One embodiment provides a system and method for managing a trail. The trail may be generated in response to receiving user input provided by a user. The trail may include multiple nodes that are interconnected. Characteristics for the multiple nodes including at least shape and color may be established. The trail may be modified in response to receiving additional user input. The trail may be displayed according to user preferences established by the user. The system may include a processor and a memory for storing a set of instructions to implement the method herein described.

Another embodiment provides a system for managing a trail. The system may include one or more clients for receiving user input. The system may include a server in communication with the one or more clients through at least one network. The server may be operable to generate the trail in response to receiving the user input provided by a user through the one or more clients, the trail includes multiple nodes that are interconnected to perform a learned process, establish characteristics for the multiple nodes including at least shape and color, modify the trail in response to receiving additional user input, and display the trail according to user preferences established by the user.

One embodiment provides a method for displaying a trail to a user. A user profile may be established for the user. A learning preference for the user is determined in response to receiving user input to multiple questions. A set of peers may be determined for the user in response to interactions with the user. A trail may be displayed for the user utilizing the set of peers.

Another embodiment provides a server for displaying a trail to a user. The logic may be operable to establish a user profile for multiple users, determine learning preferences for the multiple users in response to receiving user input to multiple questions, determining a set of peers for the user in response to the in response to interactions with the user. The server may further include one or more databases for storing multiple trails. The server may display the trails to the multiple users according to user preferences associated with each of the multiple trails.

Yet another embodiment provides a server for displaying a trail to a user. The server may include a processor for executing a set of instructions and a memory for storing the set of instructions. The set of instructions may be executed to establish a user profile for the user, determine a learning preference for the user in response to receiving user input to multiple questions, determine a set of peers for the user in response to interactions with the user, and display a trail for the user utilizing the set of peers.

One embodiment provides a system, method, and device for generating a trail. The device may include a processor for executing a set of instructions and a memory for storing the set of instructions. The set of instructions may be executed to receive user input to create a trail in response to content generated or retrieved by a user, establish a hierarchy for the trail in response to receiving the content, establish characteristics for the multiple nodes including at least shape and color, and generating the trail utilizing the hierarchy and the characteristics and according to user preferences established by the user. The trail may include multiple nodes that are interconnected.

Another embodiment provides a server for generating a trail for a user. The server may include logic operable to receive user input to create a trail in response to content generated or retrieved by a user, establish a hierarchy for the trail in response to receiving the content, the trail includes multiple nodes that are interconnected, establish characteristics for the multiple nodes including at least shape and color, and generate the trail utilizing hierarchy and the characteristics and according to user preferences established by the user. The server may include one or more databases for storing multiple trails including the trail and the user preferences.

Yet another embodiment provides a method for generating a trail. User input may be received to create the trail in response to content generated or retrieved by a user. A hierarchy may be established for the trail in response to receiving the content. The trail may include multiple nodes that are interconnected. Characteristics are established for the multiple nodes including at least shape and color. The trail may be generated utilizing the hierarchy and the characteristics according to user preferences established by the user.

BRIEF DESCRIPTION OF THE DRAWINGS

Illustrative embodiments of the present invention are described in detail below with reference to the attached drawing figures, which are incorporated by reference herein and wherein:

FIGS. 3-6 are pictorial representations of trails in accordance with illustrative embodiments;

DETAILED DESCRIPTION OF THE DRAWINGS

Figure 1:
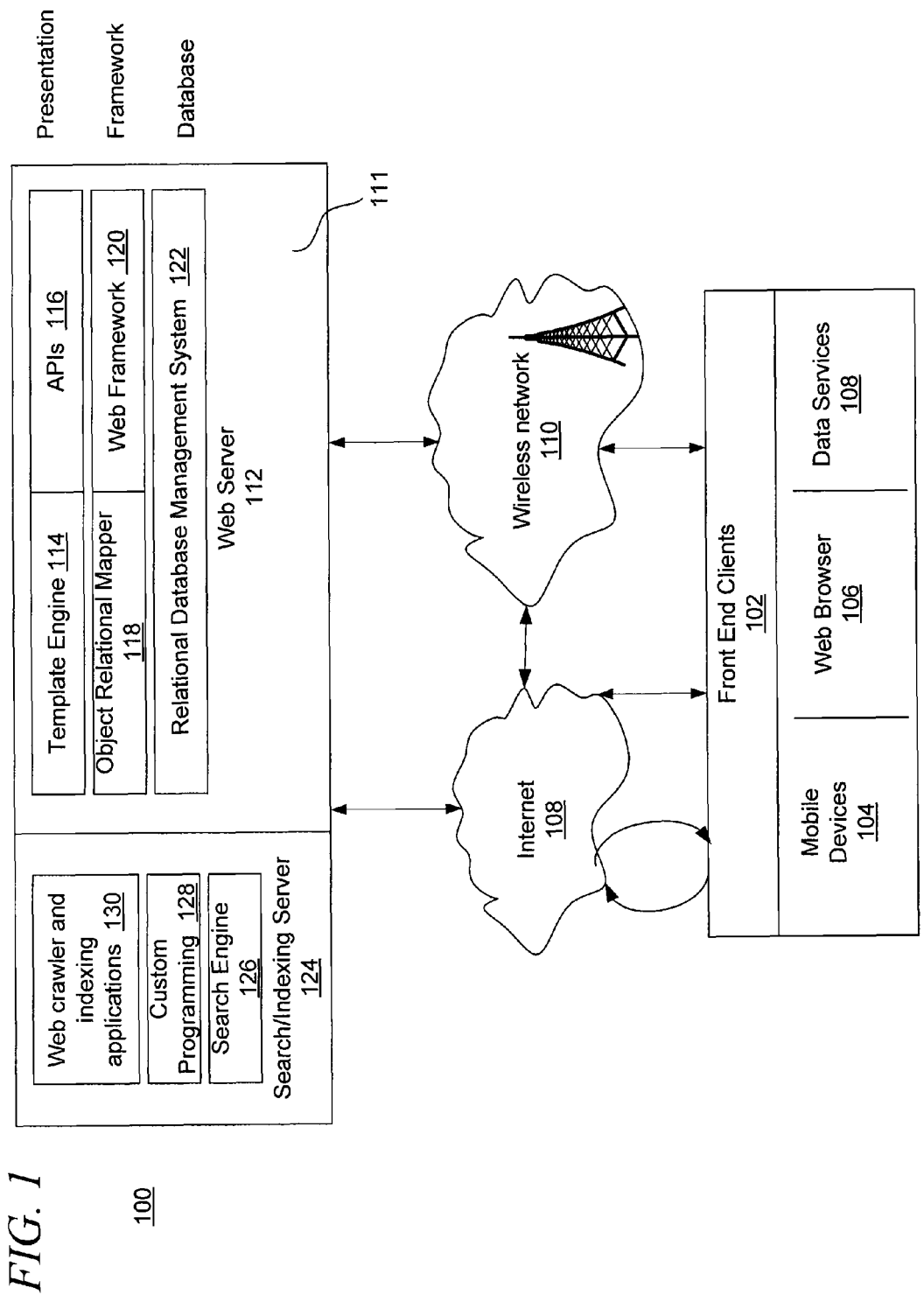
FIG. 1 is a pictorial representation of an online environment in accordance with an illustrative embodiment.

Illustrative embodiments provide a system and method for tracking and managing content. In one embodiment, the system and method may be utilized to generate trails. Trails are a collection of visual and textual indicators associated with online content, information, and data, such as websites, videos, images, lists, or other information. However, the trails may also be adapted for those users that are visually, audibly, or otherwise impaired or presented utilizing corresponding mediums (e.g. audible, tactile trails).

The trails may be hierarchically organized to include any number of components including trails, requests, users, relationships (e.g. profiles, peers, maps) or other sub-components (e.g. nodes, tags, sequences, visualization, etc). The trails may include nodes representing distinct content (i.e. uniform resource locators (URLs)), documents, files, information, videos, etc) that may be added to the system by users which may have been annotated with notes, tags, titles descriptions and other labels and which may be connected utilizing any number of connectors. The nodes of the trail may be positioned, displayed, or laid out randomly, sequentially, or in any number of automatically generated or user selected patterns. The nodes and connectors may be represented by any number of shapes, colors, patterns, and interactive features (e.g. pop-up windows, displayable information based on a mouse-over, etc).

The trails may be utilized to address any topic, process, project, research or other information. The trails may be associated with a user account and profile, including a username and password. The user account may further specify preferences and permissions for sharing all or portions of the trails that are associated with the user account. In one example, a user may make specified trails public to anyone and may include information for indexing and searching the trail. Publicly available trails may be labeled and indexed as a whole and based on their many parts for online searches performed through a specific website or through general Internet searching. In another example, the user may specify trails that are private or only shared with specific parties by invitation. The profile may be explicitly or implicitly created based on surveys, questionnaires, and actions, such as generating, cloning, reviewing, reading, or otherwise interacting with trails created by the user or other users. As a result, the profile may be updated automatically or based on user events to further customize how the user displays, manages, and accesses trails. The described system may also be utilized to filter, calculate, and return search results including 'next nodes' or 'next trails' as well as related trails, requests, and users.

In one embodiment, trails may be utilized to answer one or more questions. Rather then just curating, collecting, and sharing bookmarks and online content, trails may be utilized to provide a clear sequence and a visualization of main and tangential links, forks or branches in conjunction with nodes, notes, labels, and more to answer a question or address a particular issue. As a result, utilizing trails provides expanded information for subsequent use by any user, documentation, or information sharing activity. Trails may be particularly useful when integrated with social networking features.

The illustrative embodiments provide a system and method for creating, visualizing, and distributing trails to help users understand any topic or answer most any question. The subject matter addressed by the trail may start from either an explicitly input topic(s), from semantically expanded terms to related topics, or from analyzing the content of a question to generate relevant topic(s). Relationships, important, and context may also be utilized to generate the subject matter. One or more trails may be created which teach or address the topic or question broadly with a general framework or address the topic or question through a very specialized or focused look.

The trails may utilize URLs, or all or portions of documents, websites, videos, pictures, files, or similar media found online. The trails and the associated information, data, and files provide information, processes, and sequences, to learn the topic or answer the question. For example, the trails may be personalized and algorithmically generated for each user profile utilizing (1) implicit peer-curation, (2) learning preferences mapped between how individuals like to learn or receive information and how sites teach or offer information, and (3) sequenced and shaped tangents, forks, branches, colors, and other visual cues of conceptual and pedagogical relationships of the subject matter. Implicit peer-curation means that actions, such as rating, cloning, and pruning of user peers may be used to score, rate, filter, and otherwise shape the pool of potential trails and trail nodes (e.g. urls, documents, etc). The trail may also be generated utilizing learning preferences, maps, semantic analysis, media-type analysis, and other factors of the implemented logic. Algorithmically generated trails are similarly available for cloning, editing, rating, commenting, direct curation, and other forms of interaction.

The trails may be aggregated from learning preferences, semantic analysis, or media-type analysis into a map of characteristics for filtering, matching and peering. The aggregation of information may be utilized for both trail creating and teaching a system for sharing and so forth.

FIG. 1 is a pictorial representation of an online environment 100 in accordance with an illustrative embodiment. The online environment 100 may include any number of hardware and software components that may be utilized to generate, manage, and access trails. In one embodiment, the online environment 100 includes front end clients 102, including mobile devices 104, web browser 106, and data services 108. The online environment 100 further includes the Internet 108 and it wireless network 110. The online environment 100 further includes a Web server 112, including a template engine 114, APIs 116, an object relational mapper 118, a web framework 120, and a relational database management system (RDBMS) 120 and other data storage components. The online environment 100 further includes a search/indexing server 124, including a search engine 126, custom programming 128, and web crawler and indexing applications 130.

The front end clients 102 may include any number of electronic devices, applications, and communications and computing services. In one embodiment, the front end clients 102 may be represented by mobile devices 104, web browser 106, and data services 108. For example, the front end clients 102 may include cell phones, PDAs, tablets, personal computers, mP3 devices, e-readers, terminals, web browsers (e.g. Internet Explorer, Firefox, Chrome, Safari, Opera, etc.), websites, social networks, or other similar devices, applications, logic, or communication services.

The front end clients 102 may be a computing or communications device or the operating system, application or software for performing and executing programs and instructions and accessing the Internet 108. However, the front end clients 102 may be any computing or communications devices suitable for communicating with the Internet 108 or wireless networks 110 through a network connection. Wired connections of the online environment 100 may include fiber optics, coaxial cables, wires, telephone cables, or other wired networks suitable for communication over a hard wired connection with any of the components of the online environment 100.

The front end clients 102 may also communicate with the wireless network 110 using communications protocols, such as time division multiple access (TDMA), code division multiple access (CDMA), global systems for mobile (GSM) communications, personal communications systems (PCS), WiFi, WLAN, WiMAX, or other frequently used cellular and data communications protocols and standards. For example, mobile devices, 104 may include cellular phones, smart phones (e.g. iPhones, Android devices, etc), Blackberry® devices, personal digital assistances (PDA), mp3 players, laptops, evolution data optimized (EDO) cards, multi-mode devices, and other wireless communication devices and elements.

Communications within the online environment 100 may occur on any number of networks which may include wireless networks, data or packet networks, cable networks, satellite networks, private networks, publicly switched telephone networks (PSTN), the Internet 108, or other types of communication networks. A communications network is infrastructures for sending and receiving messages and signals according to one or more designated formats, standards, and protocols. The networks of the online environment 100 may represent a single communication service provider or multiple communications services providers. The features, services, and processes of the illustrative embodiments may be implemented by one or more elements of the online environment 100 independently or as a networked implementation. The online environment 100 may further include any number of hardware and software elements that may not be shown in the example of FIG. 1.

The web server 112 and the search/indexing server 124 (jointly server 111) may represent one or more servers. In one embodiment, the server 111 may be described in terms of presentation, framework, and database. For example, the server 111 may represent a server farm or cloud network accessible to the front end clients 102. In one embodiment, the web server 112 is a computing device composed of hardware and software that manages the creation and delivery of trails through the Internet 108 and wireless network 110. For example, the web server 112 may deliver web pages including trails to the front end clients 102 upon request. The trails may be delivered as HTML, XML, JSON, and other formats or standards and may include multiple forms of static and interactive content, such as images, stylesheets, and scripts. The components of the web server 112 represent standalone or integrated programs, software applications, and instructions that may be stored in one or more memories and executed by one or more processing units of the web server 112 to implement the systems and methods herein described.

The template engine 114 is software that that processes presentation templates and content information to produce online content and documents, including trails. For example, the content may be generated and managed by PHP, HTML, CSS, JavaScript, or other similar languages or libraries. The web template is a tool that separates content from presentation for mass production of online content and documents. The template engine 114 may present any number of trails templates in interactive forms to generate trails. For example, the template engine 114 may be a twig template engine for optimizing PHP code. PHP is a general-purpose server-side scripting language originally designed for Web development to produce dynamic Web pages. PHP may be deployed on the web server 112. Likewise, Ruby, Python, active server pages (ASP) or other server-side script engines and languages may be utilized in the web server 112.

The application programming interfaces (APIs) are a defined set of hypertext transfer protocol (HTTP) request messages, along with a definition of the structure of response messages, which is usually in an Extensible Markup Language (XML) or JavaScript Object Notation PON) format. The APIs may decouple the request and response data from any client or device and/or platform, program, system or combination thereof. Thus, the APIs allows for flexible and open interaction between the trails system and clients, devices, platforms, and systems beyond typical web and mobile browser examples. For example, an analysis system may be constructed and utilized, which, not requiring a trail, Request or user visualization, consumes the APIs simply to extract trending tag and tote data from the trail API response object and integrates it with user demographic information contained in the user API response object to generate reports on trending interests within user demographics.

The web framework 120 or application framework is software utilized by developers and other parties to implement the standard structure of one or more applications for specific development environments, such as those utilized by the Web server 112. The web frameworks may promote a standard structure for the APIs 116. The web framework 120 (e.g. Symfony2 utilizing PHP) may also define the underlying code structure for trails related applications, such that an application may inherit pre-existing classes in the web framework 120.

The object relational mapper 118 is software that converts data between different or incompatible type systems in object oriented programming languages. For example, the object relational mapper 118 may be utilized to generate a virtual object database. In one embodiment, the object relational mapper 118 may translate the logical representation of the objects in the trail into a form that may be stored in the RDBMS 120. As a result, objects may be stored and retrieved when requested by any of the front end clients 102.

The RDBMS is a database management system that controls the creation, maintenance, and use of a database in which the data for the trails is stored in tables and the relationships among the data of the trails (e.g. nodes, links, videos, images, etc.) are also stored in tables. The RDBMS may utilize any number of relational models or object models. For example, MySQL may be utilized in conjunction with a Linux, Apache, MySQL, Perl/PHP/Python (LAMP) web server. Data and relationships may also be stored in non-relational systems (often called No-SQL), such as Mongo or Couch DB.

The web crawler and indexing applications 130 are programs that browse the World Wide Web or Internet 108 in an automated manner or standardized fashion. In one embodiment, the web crawler and indexing applications 130 create a copy of all visited websites and pages for later processing by the search engine 126. The web crawler and indexing applications 130 may also index the downloaded pages to provide faster and more effective searches of Internet content including trails and a trails specific website. For example, the web crawler and indexing applications 130 may work in conjunction with the search engine 126 to collect, parse, and store data to facilitate fast and accurate information retrieval, particularly relating to trails and notes. The web crawler and indexing applications 130 may utilize any number of known web crawling and indexing applications as are known in the art.

The web crawler and indexing applications 130 may be utilized to check links or validate nodes and code of the trails. For example, the web crawler and indexing applications 130 may periodically look up the nodes of the trail to ensure that the nodes are still valid. If the nodes are no longer valid or broken, the web crawler and indexing applications 130 may automatically retrieve new links to the same content or may suggest that the user update the trail. For example, the web crawler and indexing applications 130 may suggest updates to nodes that are no longer accurate or correct.

The custom programming 128 is custom software utilized to adapt the features and functionality of the search/indexing server 124 for generating and managing trails and the related analysis and mapping logic and algorithms. The custom programming 128 may utilize languages, such as PHP, Python, or other languages.

The search engine 126 may be utilized to search for information on the Internet 108, as well as the Web server 112. The information may include trails, web pages, images, information, and other types of files or content. The search engine 126 may include any number of publicly available or private search engines that perform searches on demand or in real-time, such as those engines produced by Google, Microsoft, Yahoo, and other similar companies.

Figure 2:
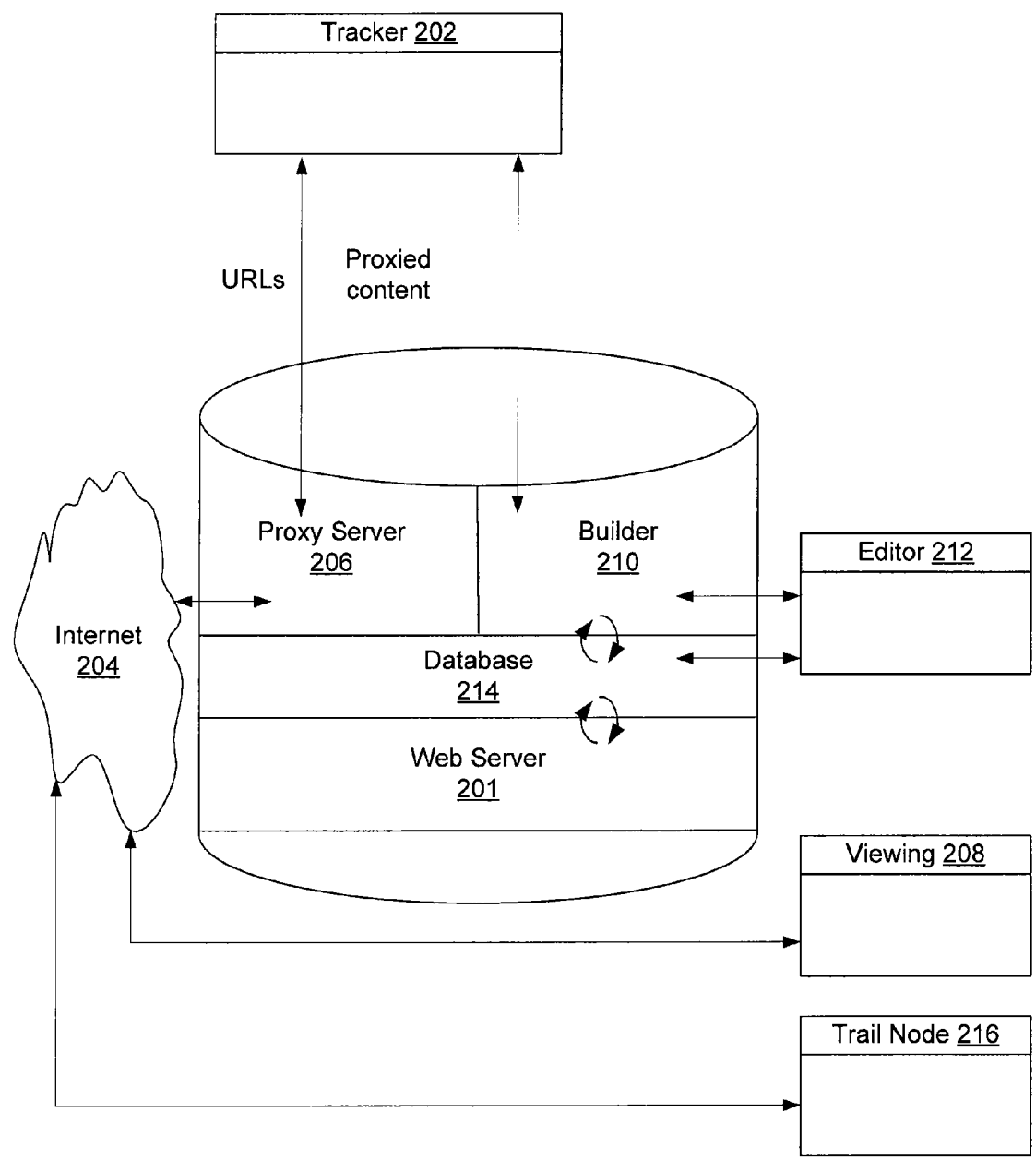
FIG. 2 is a pictorial representation of a trail management system in accordance with an illustrative embodiment.

FIG. 2 is a pictorial representation of a trail management system 200 in accordance with an illustrative embodiment. The trail management system 200 may include all or portions of the online environment 100 of FIG. 1. FIG. 2 may display the different modes and steps utilized a web server 201 to generate and manage trails.

In one embodiment, a uniform resource locator (URL) is provided by a user through a tracker interface 202. For example, utilizing a web browser or application, the user may navigate to or select a webpage. The content or resources associated with the URL may be retrieved from the Internet 204 through the proxy server 206. For example, the proxy server 206 may request the URL and process the content. The proxy server 206 may rewrite local references in the content to be absolute, so that scripts, looks, and formats of the content (e.g. cascading style sheets) are retained when the webpage is rendered in the tracker interface 202. Additionally, session variables may be set to allow manipulation of the nodes in the trail while being built. For example, the user may manipulate the nodes utilizing the viewing interface 208.

When tracking is finished, a builder 210 may process the session variables into a trail. In one embodiment, the builder may set default parameters, such as shape, sequence, draft/publish state, and more. An editor interface 212 may be automatically launched once the tracker session and trail build is complete. The editor interface 212 may allow the user to refine the trail, nodes, and associated information as are subsequently described. The editor interface 212 may also allow launching functions for saving, publishing, sharing and playing the trail. In another embodiment, once the trail build is complete an overview page may be launched which may contain an interface to allow editing trail information, such as title and description. The overview page may also be utilized to launch functions such as saving, publishing, sharing, or playing the trail.

Once the editing is completed, a database 214 is updated to reflect the changes to the trail. The database 214 may create logs for analysis and building profiles. The viewing interface 208 may be utilized to display a trail overview page and an associated public URL associated with the page (e.g. trails.by/mario/how-to-diagram-trails). A trail node interface 216 may also have a public URL, an API representation, and widget/embed code. The trail node interface, 216 may allow or retrieve content associated with the nodes and direct navigation to the different nodes of the trail. The viewing interface 208 may allow the user to play the trail by launching the trail node pages (e.g. trais.by/Mario/how-to-diagram-trails/1, trails.by/mario/how-to-diagram-trails/2, etc).

In one embodiment, the user may perform any number of activities during the tracking or playing state of a trail. In one embodiment, the tracker interface 202 may cURLs (cURL is a computer software project providing a library and command-line tool for transferring data using various protocols) the content of a page and rewrite it so that the trail management system 200 may track their movements thru the web. The cURLed/rewritten content is presented to the user in an i-framed environment, wherein the trail management system 200 manages the i-frame for obtaining the click and link data emanating from the user's interactions (typically in a 'foreign' i-frame, that data is not available to the outer/hosting environment.)

In another embodiment, the tracker interface 202 may track clicks when playing trails by collapsing or combining tracker and player interfaces into one user-experience. For example, when a user plays a trail, the user is navigated thru cURLed content re-presented in the i-frame of the trail management system, such that the node link clicks (i.e. not navigation clicks thru the upper navigation bar's previous/next buttons or clicks on the trail visualization) are tracked and logged to the database 214 for analysis and for generating automatic clones of the source trail with new navigation appended as tangents and branches to produce automatically cloned trails.

FIGS. 3-6 are pictorial representations of trails 300, 400, 500, and 600 in accordance with illustrative embodiments. In one embodiment, the trails may be displayed by a browser or other application. The trails 300, 400, 50, and 600 may be displayed in a display or navigation mode, editor mode, a cloning mode, or other mode. The trails 300, 400, 500, and 600 show variations in the relationships of nodes. For example, the link visualization, shape, size, and color of nodes may vary by trails 300, 400, 500, and 600. In one embodiment, the nodes are interconnected by lines making up the trails. The lines may not have a specific start or end point or directional indicators because there is no prescribed sequence. In another embodiment, the lines may include a numbered order or arrows indicating a sequence order if preferred by the generating user.

The nodes of each of the trails 300, 400, 500, and 600 may display content associated with each of the nodes according to interactive or non-interactive triggers, as configured by the preferences of the trail center. As a result, a user may be presented a preview before the user view and navigate the trails 300, 400, 500, and 600 at his/her leisure and convenience.

For example, with regard to FIG. 4, the user may navigate the trail 400 by selecting a node, such as nodes 402, 404, 406, 408, or 410. The trail 400 may be configured to show linear information or nonlinear information. For example, the nodes of trail 400 that extend along a straight line may represent linear information. Nodes 406, 408, and 410 may represent tangential information that the user still finds important enough to share but that may deviate from the original question or topic process. Alternatively, the nodes 406, 408, and 410 may represent alternative trails or pathways that may be useful to other users.

In one embodiment, trail 400 may be generated in response to a request. For example, a user may request information on a website, such as "How do you remove red eyes in Photoshop?", "How do you successfully grow tomatoes in Kansas City?", or "What exercises are best for lower back injuries?" In one embodiment, the trail title may be the original request. In another embodiment, the trail tide may be specified by a user, but the original request may also be listed. The trail 400 may also include a description that provides a summary or overview of the information addressed by the trail 400. In one embodiment, the trail 400 may include tags, which are user-supplied keywords used in indexing, searching, relating, suggesting, and filtering trails and nodes. The individual nodes of a trail may also have tags which are user-supplied for that node in that trail. For example, the CNN website might be a node in multiple trails with tags "news, politics" in Trail A and "world, news, sports" in Trail B. A node's tags are used in indexing, searching, suggesting, filtering, and relating nodes and trails. A combination of trail and node tags, in conjunction with other factors, may also be used for algorithmically generated trails.

A session variable may be created in response to a user selecting to "Propose a Trail as an Answer" when viewing a request. The session variable carries the request tags into the next trail edited, allowing the user to make a new trail or edit an existing trail. Shared tags among trails, and requests may be connected for better information exchange and increased relevance in searching and filtering.

In one embodiment, once the trail 400 is loaded for editing. The system first checks for tags in a session variable and/or from a database. Next, the system finds requests which share tags in (tags may be scored by count and semantic values). Next, the system allows the user to choose the trails that best answers the request.

Once a request is received from a user to save the trail 400, the trail 400 and request may be saved in a database. Next, the system sends a notification to the system and request owner that the trail 400 has been proposed as an answer so that the requestor may play the trail and may select to have the trail 400 show up on the request's page as the 'best answer' trail.

Once the user is signed in any number of editing functions may be performed or required within or separate from an editing mode or interface. For example, the title, description, and tags associated with different nodes may be set. The user may alter the shape and sequence of the nodes in the trail 400. The user may also set the status of the trail 400 between draft or published (e.g. the draft trail is only visible to the owner, a published trail may be available to the public), free or paid, or public or private. In addition, the user may add notes or tags to nodes. The user may add or delete nodes and URLs and files from a content library. The user may also select to connect or associated the trail 400 with a trail request or questions. The user may also delete the trail 400 altogether.

As previously described, the nodes may have no defined sequence. In one embodiment, the trail 400 may be assigned a sequence based on time of generation. In another embodiment, the user may set a sequence for the trail 400 by selecting the nodes in an order the nodes are to be labeled or sequenced. For example, the nodes may display numbers indicating a sequence selected by the user. The nodes of the trail 400 may be linear, non-linear (spirally positioned), divergent, based on shapes, or randomly positioned. The user may also set the status of the trail 400 between draft or published (e.g. the draft trail is only visible to the owner, a published trail may be available to the public). In addition, the user may add notes or tags to nodes. The user may add or delete nodes and URLs and files from a content library. The user may also select to connect or associated the trail 400 with a trail request or questions. The user may also delete the trail 400 altogether.

As previously described, the nodes may have no defined sequence. In one embodiment, the trail 400 may be assigned a sequence based on time of generation. In another embodiment, the user may set a sequence for the trail 400 by selecting the nodes in an order the nodes are to be labeled or sequenced. For example, the nodes may display numbers indicating a sequence selected by the user.

Figure 5:
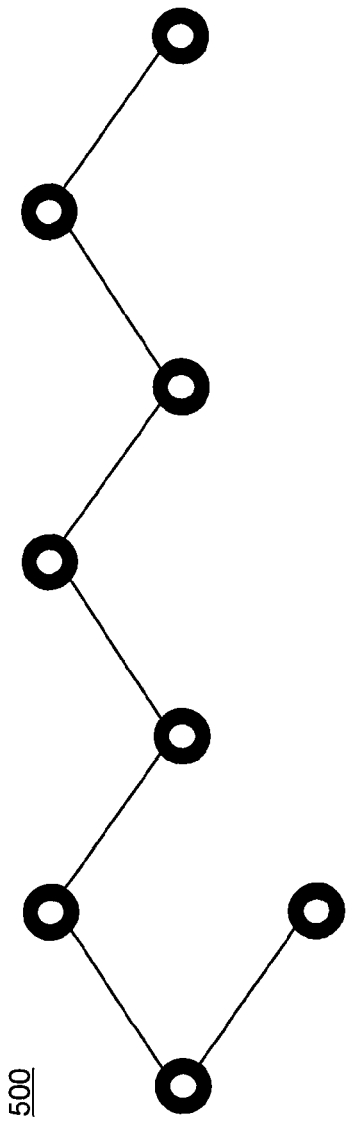

Referring now to FIG. 5, the trail 500 may include multiple nodes positioned as selected by user. The trail 500 may also include one or more divergent paths or additional nodes. The trail 500 illustrates how the nodes may be positioned nonlinearly by the user.

Figure 6:
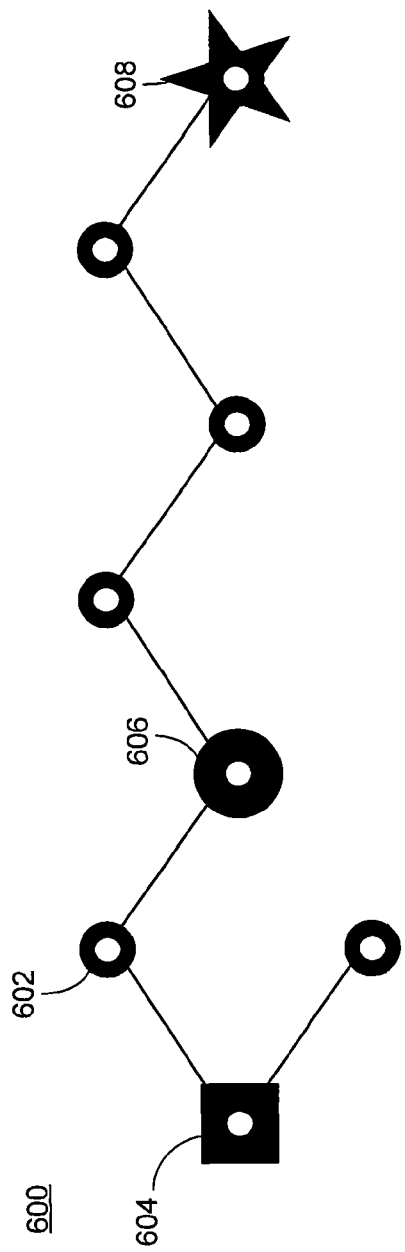

Referring now to FIG. 6, the trail 600 illustrates nodes 602, 604, 606, and 608 that may vary in size, shape, and color. The nodes 602, 604, 606, and 608 vary in size, shape, and appearance. In one embodiment, the size, shape, color or appearance of the nodes 602, 604, 606, and 608 may correspond to the information stored in the node. The nodes 602, 604, 606, and 608 may be automatically selected or selected by the user.

Figure 7:
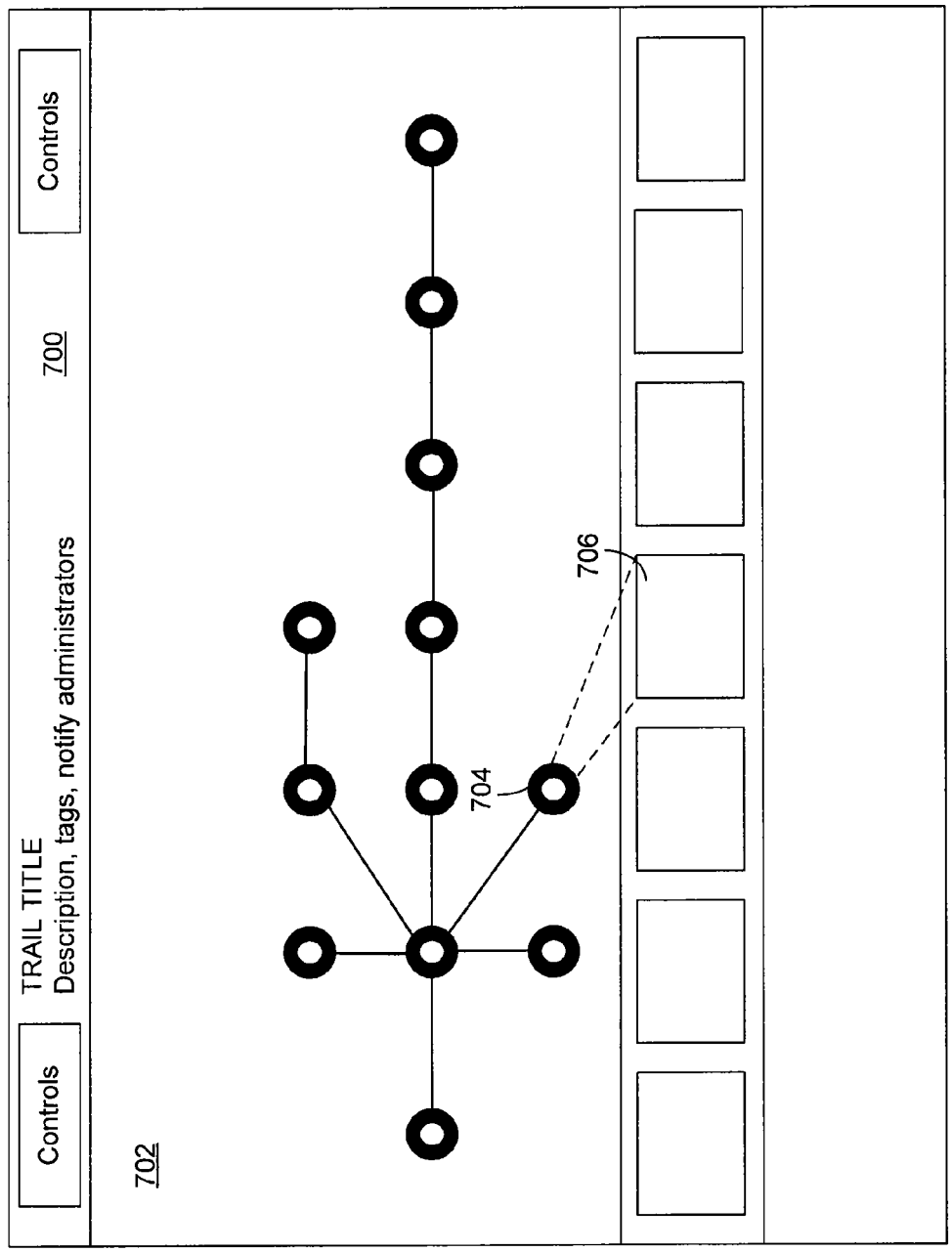
FIG. 7 is a pictorial representation of a trail overview interface in accordance with an illustrative embodiment.

FIG. 7 is a pictorial representation of a trail overview interface 700 in accordance with an illustrative embodiment. In one embodiment, the trail overview interface 700 may be utilized to view a trail 702 and the associated information. For example, the trail overview interface 700 may allow a user to sign in with a username and password (not shown). The trail overview interface 700 may be integrated with or separate from the editor interface as was previously described. In response to signing in, the trail editor may be displayed. As a result, the user may edit the node notes and tags utilizing the trail overview interface 700 (e.g. via AJAX save).

If the user is not signed in or the trail 700 is not associated with the user, the trail 700 may be cloned and a trail editing function displayed.

The trail overview interface 700 may allow the user to start the trail 702. The user may select a node 704 or thumbnail 706 to see additional information, such as a clickable URL, the node's title, notes, and tags. The trail overview interface 700 may also be utilized to add a comment, share a trail through a social network (e.g. Facebook, twitter, e-mail, code and sentence etc.), view statistics (e.g. shares, clones, ratings etc.), flag the trail 702 for notifying an administrator, rate the trail 702 utilizing a scale, numeric value, thumbs up or thumbs down, or other similar writing, subscribed to tags for the trail 702, or subscribe to the user or curator that generated the trail.

Figure 8:
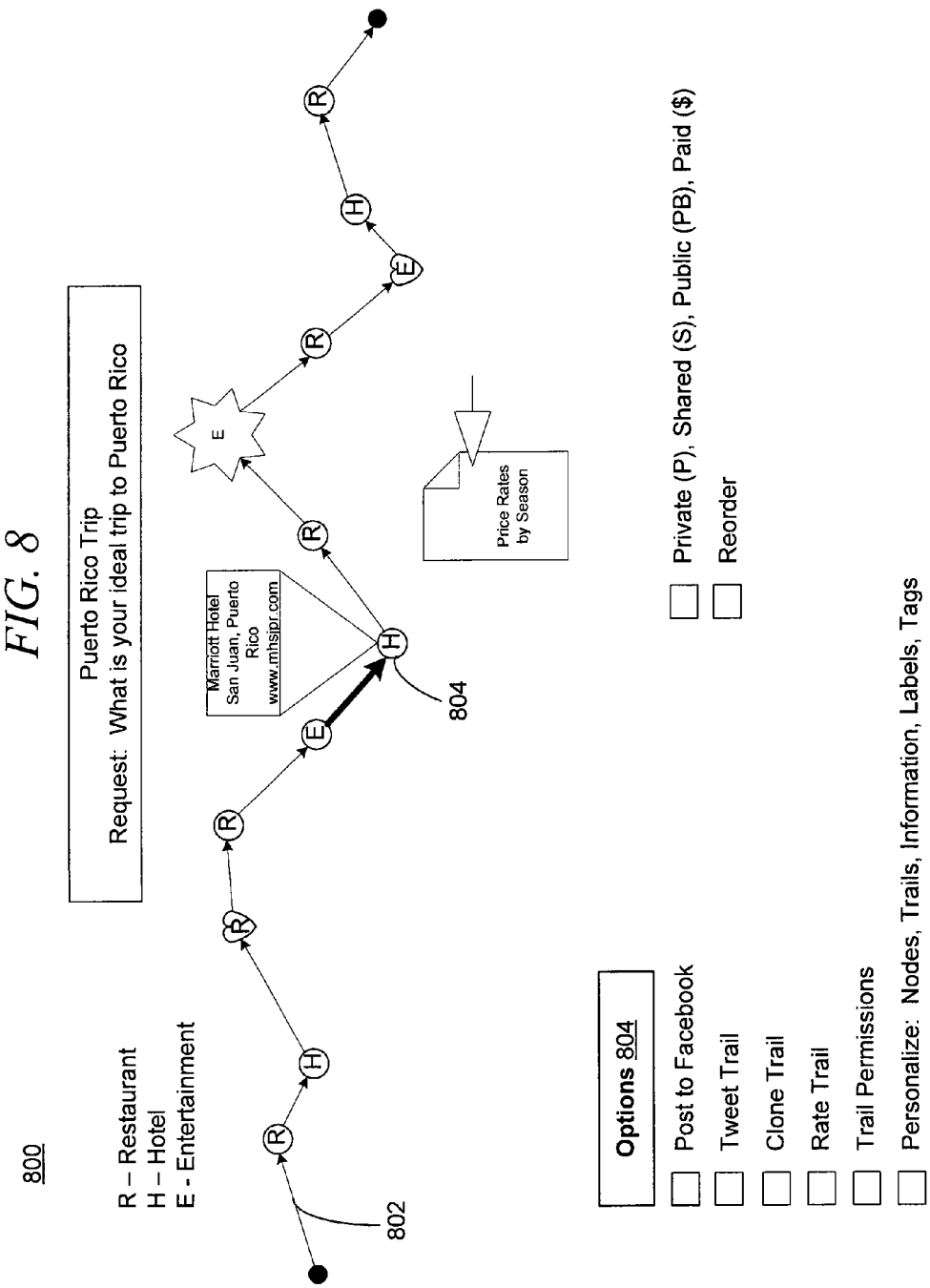
FIG. 8 is a pictorial representation of a display interface in accordance with an illustrative embodiment.

FIG. 8 is a pictorial representation of a display interface 800 in accordance with an illustrative embodiment. The display interface 800 shows one embodiment of a trail 802. In this example, the trail 800 may be titled "Puerto Rico Trip" and may be a response to a request "What is your ideal trip to Puerto Rico?"

The trail 802 shows the nodes labeled according to various categories. In this example, the categories or types of nodes include restaurant, hotel, and entertainment. In addition, the connections between notes may include arrows indicating a defined sequence in order selected by the user. In one embodiment, a pop-up, window, thumbnail, or other interactive display may be displayed in response to the user selecting a node 804 or hovering over the node 804. The trail 802 includes various sizes and shapes of nodes. The beginning and ending nodes of the trail 802 may also differ.

In one embodiment, the display interface 800 may include options 804. The options 804 may allow the user to share, duplicate, rate, or reorder the trail 802 or portions of the trail 802. In one embodiment, in response to a selection of one of the options 804 and editing or personalization interface may be displayed to the user to configure permissions, notes, labels, tags or so forth.

Figure 9:
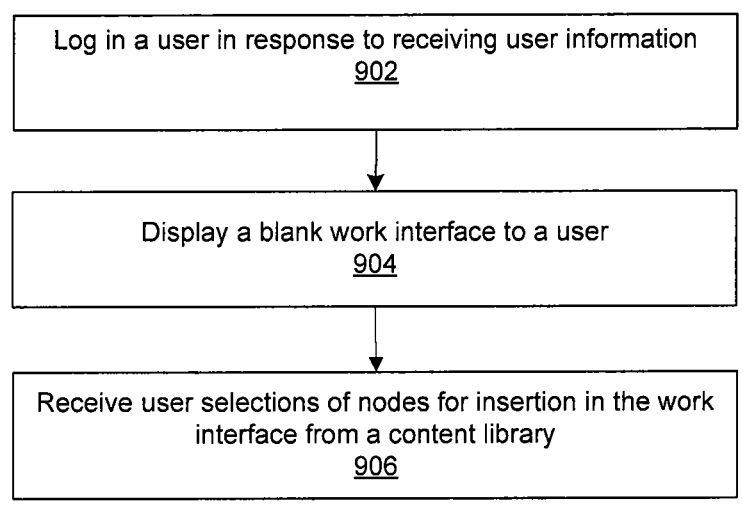
FIG. 9 is a flowchart of a process for creating a trail from a template in accordance with an illustrative embodiment.

FIG. 9 is a flowchart of a process for creating a trail from a template in accordance with an illustrative embodiment. The process of FIGS. 9-12 may be implemented from one or more communicating devices or systems (referred to herein as the "system"). The process of FIG. 9 may begin by logging in a user in response to receiving user information (step 902). In one embodiment, the user information is a username and password. The user information may also be a username or identifier utilized with any number of other social networks, services, or compatible websites/interfaces.

Next, the system displays a blank a work interface to the user (step 904). In one embodiment, the blank work interface is a blank canvas or template that includes no nodes or links may be utilized by the user. The system may require user information or a login during step 902 so that a content library is available to the user during generation of the trail.

Next, the system receives user selections of nodes for insertion in the work interface from a content library (step 906). For example, the user may utilize a touchscreen of a tablet to drag a node from a content library into their work area to in the process of manually creating a trail. Trails may be created and edited utilizing drag and drop methodologies. For example, pictures, videos, files or URLs may be dragged to associated content with each node. Similarly, the nodes may be positioned or reordered by dragging the nodes or other components of the trails.

Figure 10:
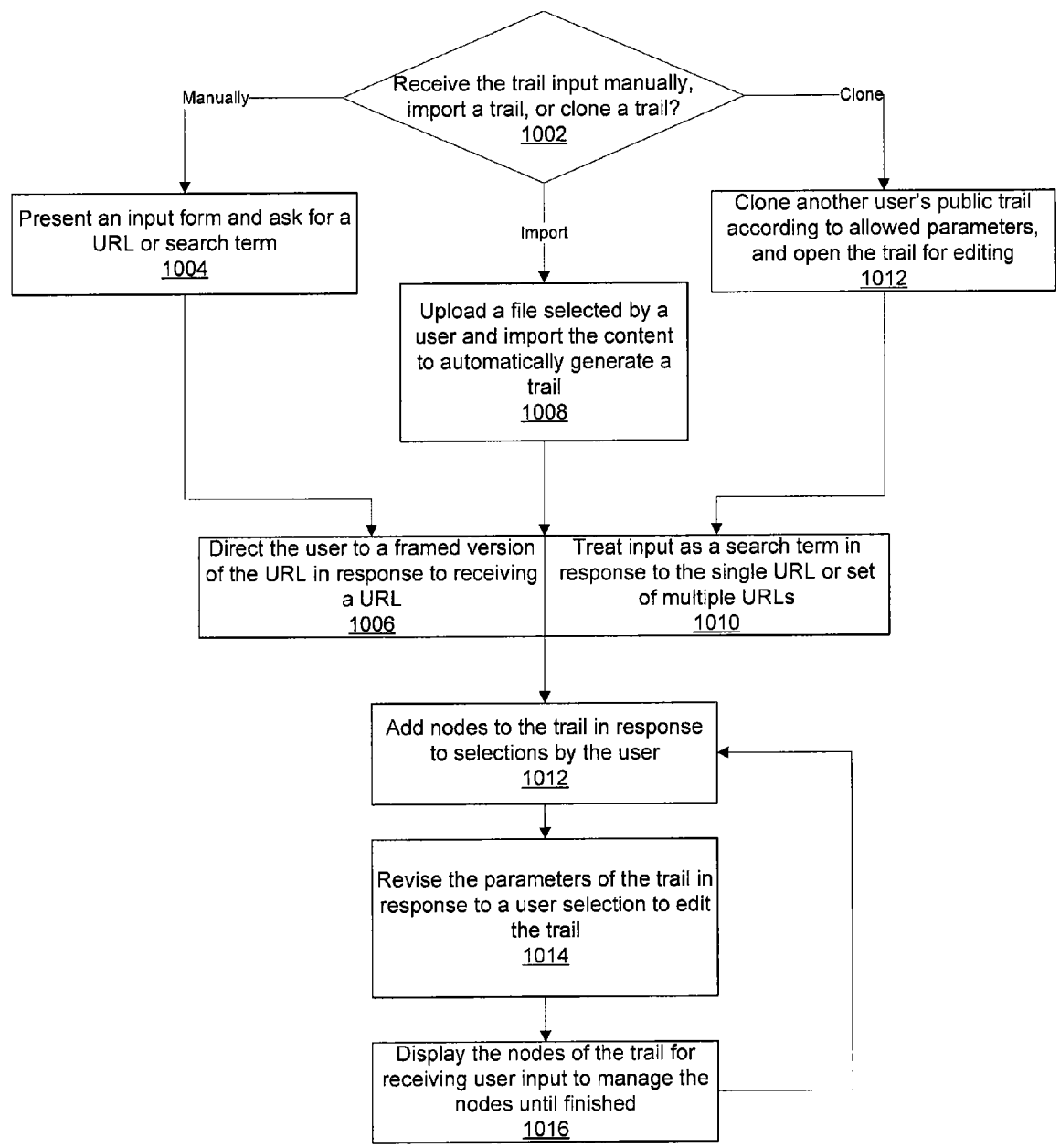
FIG. 10 is a flowchart of a process for creating a trail in accordance with an illustrative embodiment.

FIG. 10 is a flowchart of a process for creating a trail in accordance with an illustrative embodiment. The process of FIG. 10 may be implemented by a computing system or communication system interacting with a user. In one embodiment, the user interactions and feedback may be received through a user interface.

The process may begin with a determination whether to receive the trail input manually, import a trail, or clone the trail (step 1002). The determination of step 1002 may be performed in response to a user selection. For example, the user may select to generate a new trail. Alternatively, the user may select to import or clone a trail previously created by the user or from another user.

If the system determines to receive the trail input manually, the system presents an input form and asks for a URL or search term (step 1004). The input form may be a default form for creating a new trail. In another embodiment, the input form may be generated based on the user's history or previous selections. In another embodiment, the system may receive input from a bookmarklet or other source of code available to a modern web browser. In another embodiment, the system may receive input from a CSV file, or from a remote system to the API. In some cases, the user may prefer to start a trail from scratch. In order to document a process or method from the very beginning. In one embodiment, a received URL or search term may be utilized as a first node of the trail.

Next, the system may direct the user to a framed version of the URL in response to receiving a URL (step 1006). In one embodiment, the system may display a tracker mode of the trail generator for viewing the URL and associated content. In one embodiment, the system may return an API response confirming a successful reception of trail input.

If the system determines to import a trail during step 1002, the system uploads a file selected by user and imports the content to automatically generate the trail (step 1008). The file may be a list of URLs or websites that include content utilized to form the trail. The file may also be a document or a number of bookmarks that are compiled together. Any number or types of files may be utilized to import the content utilized to generate the trail.

Next, the system may treat the input as a search term in response to the input not being a single URL or set of multiple URLs (step 1010). Step 1006 may be utilized if the file or input consists of a single URL. Steps 1006 and 1010 may be performed simultaneously for input that does and does not include URLs.

If the system determines to clone a trail, the system clones another user's public trails according to allow parameters, and opens the trail for editing (step 1012). Many users may encourage sharing and crowd sourcing information for the trails by setting them to be publicly available. Users may also specify parameters for sharing trails. For example, trails may be shared with individuals that are associated with a particular group. The parameters may also specify individuals or groups that may not access or clone the user's trail. In addition, the parameters may specify notices regarding terms of use for cloning the user's trail. Next, the system processes the clone trail according to steps 1006 and 1010.

Next, the system adds nodes to the trail in response to selections by the user (step 1012). The system may be configured to monitor selections, steps, or navigation by a user and automatically add those steps as nodes to the trail. For example, as the user navigates webpages, each URL may be added as a note to the trail and may be subsequently reordered, removed, or otherwise managed.

Next, the system may revise the parameters of the trail in response to user selections to edit the trail (step 1014). Next, the system may display the nodes of the trail for receiving user input to further manage the nodes (step 1016). The process of steps 1012-1016 may be repeated a number of times until the user is finished or selects to save or post the trail.

Figure 11:
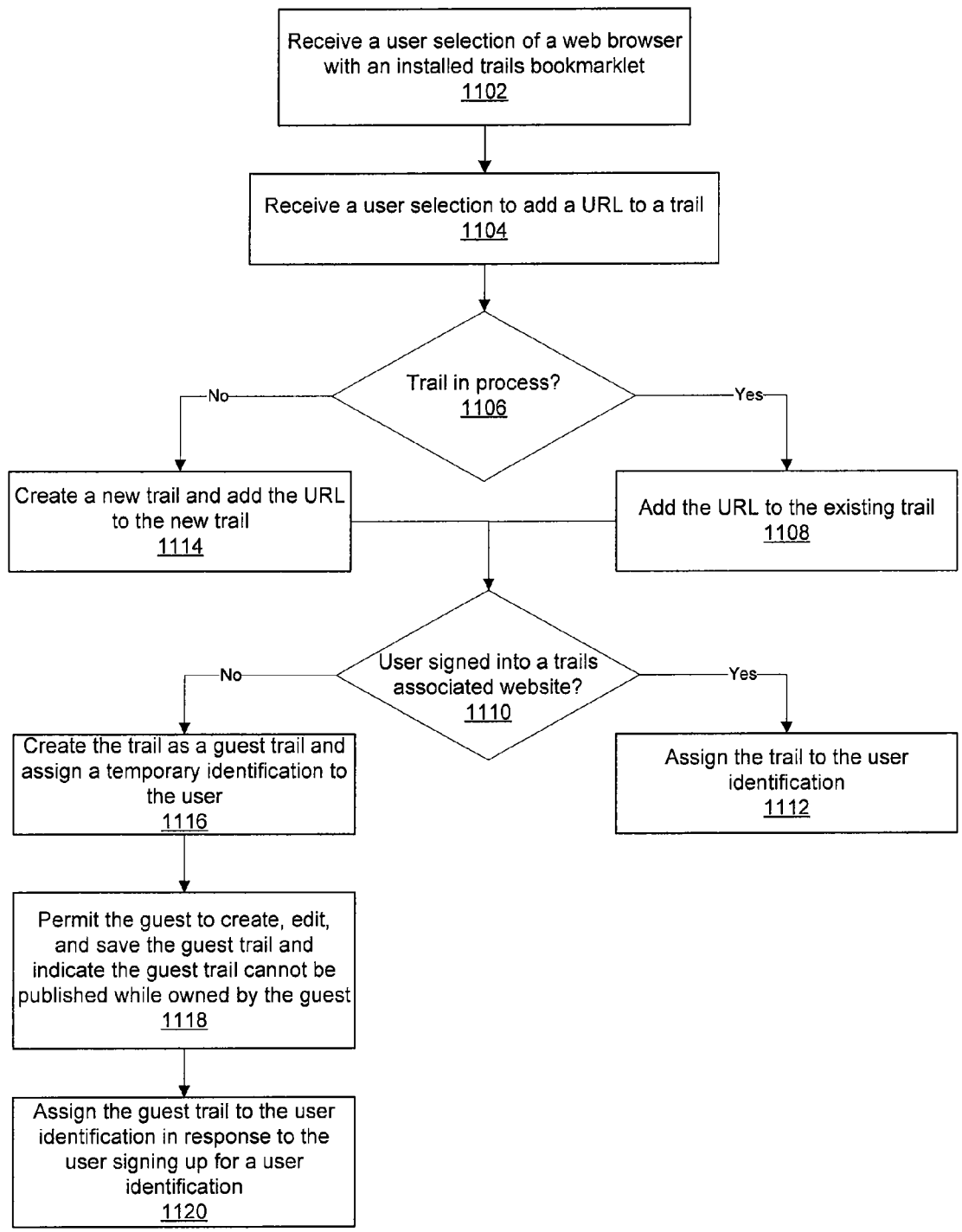
FIG. 11 is a flowchart of a process for generating trails in accordance with an illustrative embodiment.

FIG. 11 is a flowchart of a process for generating trails in accordance with an illustrative embodiment. The steps of FIG. 11 are not necessarily performed sequentially, but instead may be performed in any number of potential sequences involving the steps and processes of FIG. 11 and the other described embodiments. The shown embodiment and use of the term "next" is only one of innumerable potential sequences. The process of FIG. 11 may begin with the system receiving a user selection of a web browser with an installed trails bookmarklet (step 1102). The bookmarklet may be a script, program, instructions, or add-on that is integrated with or separate from the web browser.

Next, the system receives a user selection to add a URL to a trail (step 1104). In one embodiment, the user may select an icon, enter a shortcut, give a voice command, or otherwise select to add the URL to the trail.

Next, the system determines whether a trail is in process (step 1106). If the system determines the trail is in process, the system adds the URL to the existing trail (step 1108). Next, the system determines whether the user is signed into trails associated website (step 1110). If the user is signed into a trails associated website, the system assigns the trail to a user identification (step 1112). The user identification may be an account, user profile, username, login, customer number, or other information associated with the user. The trail is assigned to the user so that the user may subsequently access and manage the trail. In addition, each new or previously created trail created by this signed in user is associated with the user and controllable by the user.

If the system determines a trail is not in process during step 1106, the system creates a new trail and adds the URL to the new trail (step 1114). Next the system determines whether the user is signed into a trails associated website (step 1110). If the system determines the user is not signed into a trails associated website during step 1110, the system creates the trail as a guest trail and the signs a temporary identification to the user (step 1116). The system permits the guest to create, edit, and save the guest trail and indicates the guest trail cannot be published while owned by the guest (step 1118). Next, the system assigns the guest trail to the user identification in response to the user acquiring a user identification (1120).

Figure 12:
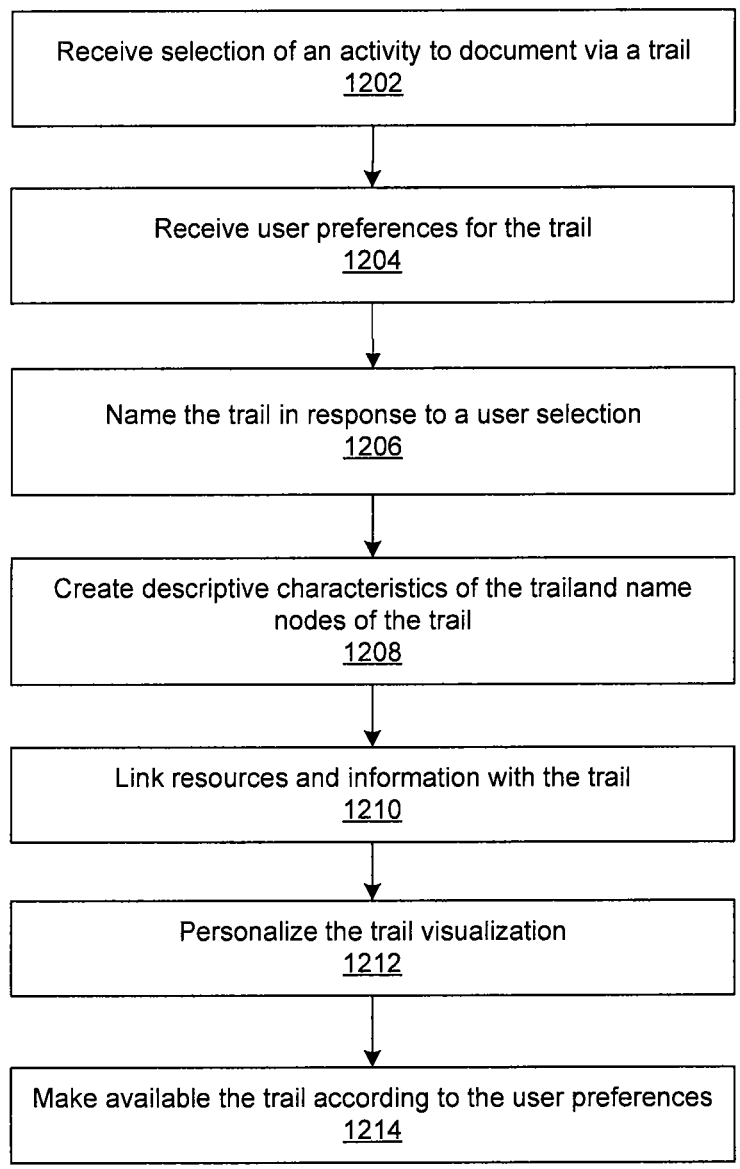
FIG. 12 is a flowchart of a process for managing a trail in accordance with an illustrative embodiment.

FIG. 12 is a flowchart of a process for managing a trail in accordance with an illustrative embodiment. The process of FIG. 12 may begin by receiving a selection of an activity to document via a trail (step 1202). The activity may be any number of processes that may be performed utilizing the computer or that may be learned via the computer or communications device. For example, the activities may include any number of activities, such as learning how to research your ancestors, planning for a vacation, teaching kindergartners to tie shoes, or how to clean a gun.

Next, the system may receive user preferences for the trail (step 1204). The user preferences may include parameters, selections, or feedback that controls the access and management of the trail. The system names the trail in response to a user selection (1206). For example, the user may specify "Selling a house yourself" as the title. In one embodiment, the system may provide suggested names based on an original question, selections, related URLs, or other information associated with the trail. The system may even provide and automatically generated name until replaced by the user.

Next, the system may create descriptive characteristics of the trail (step 1208), such as notes, tags, and description. The descriptive characteristics (e.g. name of the nodes) may be similarly selected or input by the user. In another embodiment, the descriptive characteristics may be automatically completed in response to the associated URL, information, video, or so forth. Next, the system may personalize the trail visualization (step 1212). During step 1212, the user may select or create the shapes, colors, descriptions, nicknames, configuration, and sequence of the trail, nodes, interconnecting lines (or connectors), and other components of the trails. The nodes and connectors may be arranged and rearranged according to user input. The user may also select whether pop-up windows or information are displayed and other viewing preferences for the trail. The user may also set parameters to show or hide pop-up windows or other visual information for the trail. This information may be exposed automatically according to events (i.e. page refresh, or relative or absolute time triggers) or according to interaction(s), such as hover, focus, blur, load, unload of responses, requests or other interaction-based triggers.

Next, the system makes available the trail according to the user preferences (step 1214) or system default preferences. During step 1214, the system may hierarchically organize the information and data associated with the nodes, connectors, and other components of the trail. In one embodiment, the user preferences may indicate whether the trail is public, private, paid, or otherwise shared. The user preferences may also specify notifications or messages that may be sent to the user and other interested parties in response to the trail being posted. The trail may be posted, communicated, displayed, or otherwise made available.

In one embodiment, the trails systems and software herein described may generate revenue primarily as an SAAS offering with membership tiers. The base tier may be free and allows essentially a full experience (for guests or signed-in users) with the core elements of trails, requests, a user profile, and more. In one embodiment, two paid tiers for individuals or small organizations offer increasing benefits such as public/private options, color options, increased storage, usage analytics, and more. A top level tier may include a hosted install for larger organizations or those desiring full control of a unique URL, such as sxsw.trails.by, complete control of look and feel including site theming and customization, featuring and promotion of users, requests, and trails, fine-grained access-control, ability to push trails to users, and so forth. However, sources of revenue may include advertising, data-analysis, e-commerce, and referral methods, among others known in the art for content based sites and applications.

Figure 13:
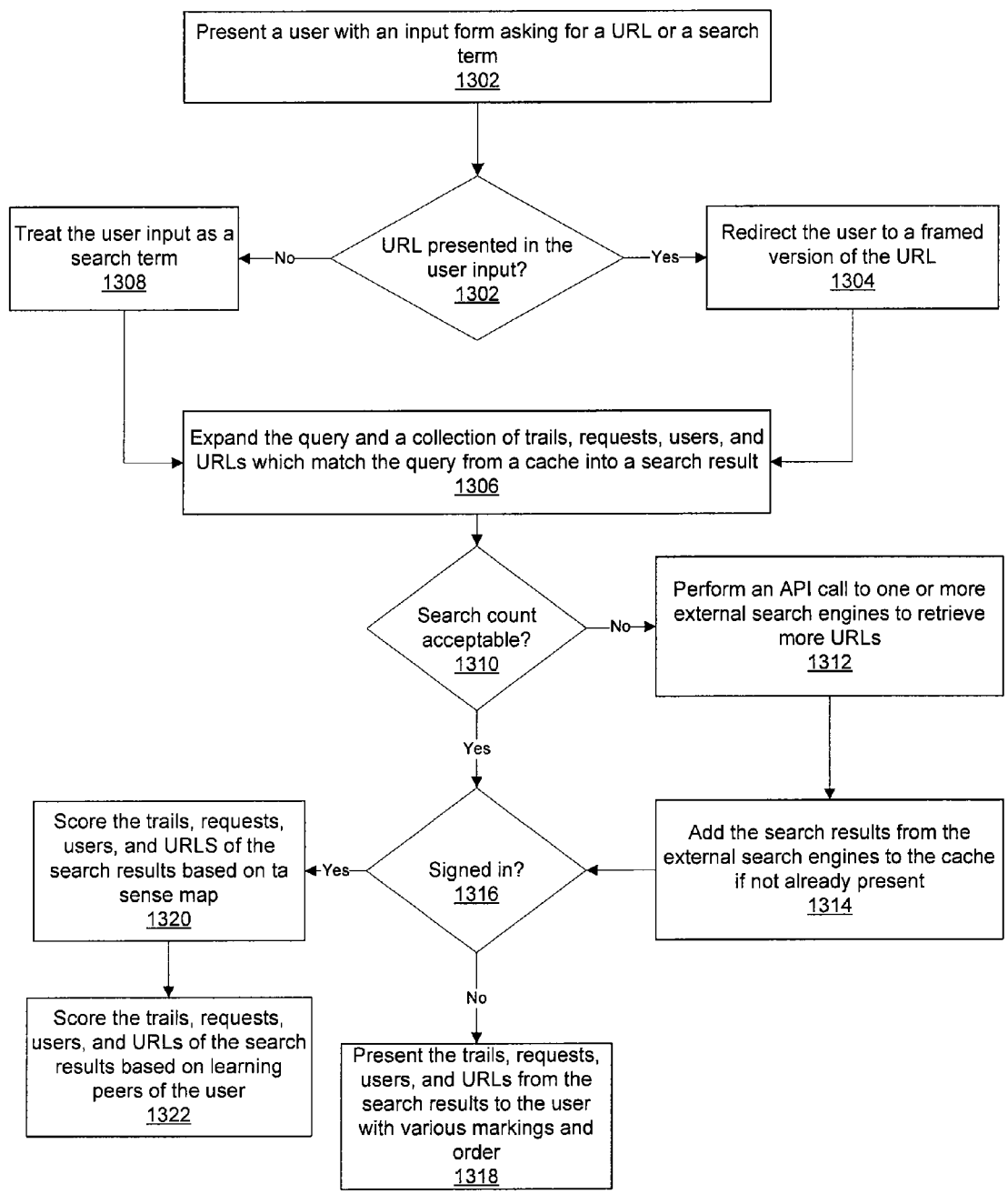
FIG. 13 is a flowchart of a process for searching trails in accordance with an illustrative embodiment.

FIG. 13 is a flowchart of a process for searching trails in accordance with an illustrative embodiment. The process of FIG. 13 may begin with the system presenting a user with an input form asking for a URL or a search term (step 1302). The input form may be a webpage, application, search field, or so forth.

Next, the system determines whether a URL is present in the user input (step 1302). If a URL is present in the user input, the system redirects the user to a framed version of the URL (step 1304). For example, the user may view the search results in the "Tracker" mode of the website or application.

Next, the system expands the query and a collection of trails, requests, users and URLs which match the query from a cache into a search result (step 1306). If possible, the system retrieves available information, including trails, requests, users, and URLs from the cache or other memory of the system. In one embodiment, light-weight semantic processes are utilized to expand the query and collection of trails and URLs from the cache. For example, the system may utilize both off-the-shelf software packages (SOLR, NUTCH, NLTK, etc), external APIs, and custom code (i.e. python) to implement semantic expansion.

If the URL is not present in the user input in step 1302, the system treats user input as a search term (step 1308). As a result, the user input may be treated as a URL or as a search term for quickly returning results. The system then expands the query and a collection of trails, requests, users, and URLs which match the query from a cache into a search result (step 1306).

Next, the system determines whether the search count is acceptable (step 1310). In one embodiment, the search count may indicate a threshold level or minimum amount of search results that must be returned to meet the search count. In another embodiment, relevance may be utilized to determine whether the search count is acceptable. If the search count is not acceptable, the system performs an application program interface call to one or more external search engines to retrieve more URLs (step 1312). The system may add the search results from the external search engines to the cache if not already present (step 1314).

Next, the system determines whether the user is signed in (step 1316). Step 1316 is also performed in response to determining the search count is acceptable during step 1310. During step 1316, the user may also be presented with the option to sign in if the user has a username and password for example. If the user is not signed in, the system presents the trails, requests, users, and URLs from the search results to the user with various markings and order (step 1318).

If the system determines the user is signed in, the system scores trails, requests, users, and URLs of the search results based on a sense map (step 1320). The sense map is a product of learning preference, semantic, and media type analysis of the user's history of interactions. During step 1320, the search results may be reordered or prioritized based on the sense map to make the results more applicable to the user. Whether the user is signed in may be important because a user profile may be created for each user. The profile may be created and updated based on the trails, requests, and users the user creates, views, rates, clones, and comments upon. The learning preference map, media types, and semantic analysis of the trails, requests, users, and URLs in the trails' nodes, notes, tags, descriptions and other characteristics and are factored into the ranking of search results for the user.

Next, the system scores the trails, requests, users, and URLs of the search results based on learning peers of the user (step 1322). The search results may also be reordered or prioritized during step 1322 in response to the learning peers of the user that may be calculated for the search results. Trails, requests, users, and URLs may also garner ratings from learning peers, who are users that are determined to be similar based on learning preference scores. As a result, a subset of search results may be generated utilizing the learning preferences. Peer relevance is a set of scores along several dimensions, including typical user profiling dimensions, such as demographics and geodata, and other dimensions created by the system's analysis. The system creates the learning preference map of the learning preferences desired by the user and the learning preferences offered by URLs and nodes (e.g. URLs added to the system by user which may have been annotated by notes, tags, titles and descriptions) and by extensions the trails in which those URLs and nodes reside. As a result, the system creates and presents search results for trails, requests, and users that are more relevant to how a user likes to learn.

Figure 14:
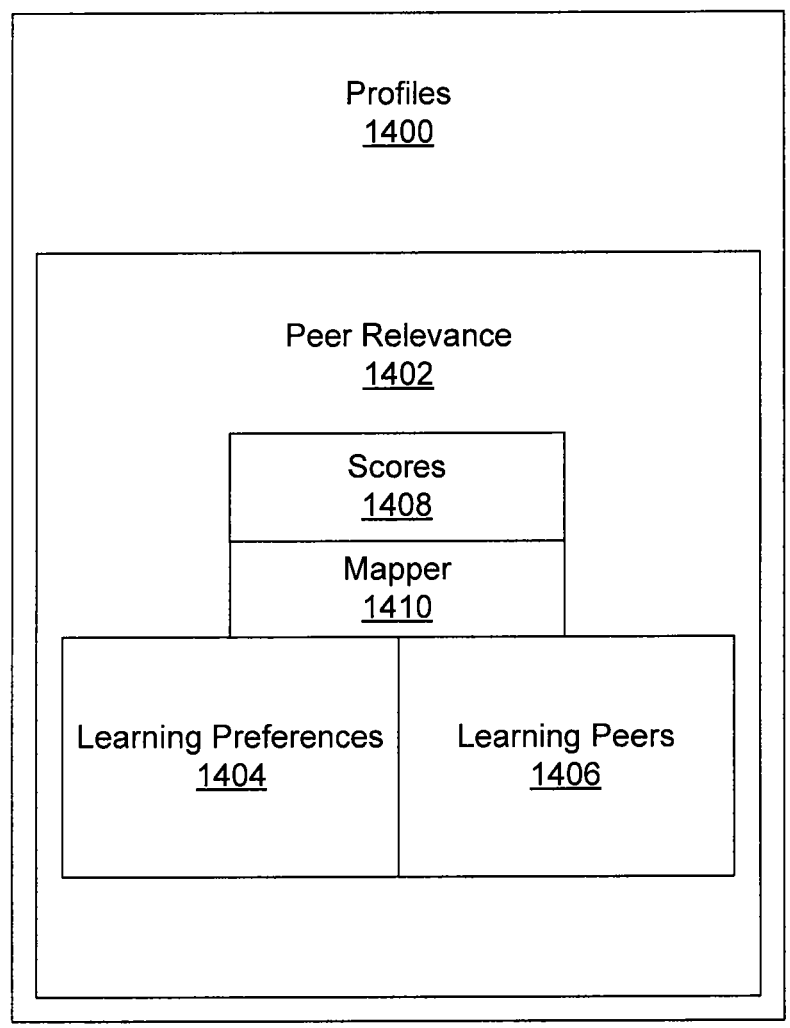
FIG. 14 is a pictorial representation of profiles in accordance with an illustrative embodiment.

FIG. 14 is a pictorial representation of profiles 1400 in accordance with an illustrative embodiment. The profiles 1400 are maintained for a number of users. The profiles 1400 may be utilized to store user preferences associated with each of the users. The profiles 1400 may also store or associate trails with the users. The user preferences may include information for limiting search results including trails, requests, users, and URLs returned to a user after a query or on a personalized interests page. The profiles include multiple dimensions, factors, or logic that may be utilized to customize information for users. The profiles 1400 may be stored in any number of memories or databases for access.

In one embodiment, relevance of trails may be performed utilizing a sense map and peer relevance 1402. The peer relevance may be a module, program, script, logic, or executable instructions. The peer relevance 1402 may include learning preferences 1404, learning peers 1406, scores 1408, and mapper 1410. The information retrieved or stored by the learning preferences 1404 and the learning peers 1406 may be utilized to generate the scores 1408 which may then be associated with each of the profiles 1400. The scores 1408 are generated based on the implicit and explicit actions of the user. The scores 1408 may be implicitly affected by cloning, creating, viewing, rating, editing/pruning of trails and nodes. The scores 1408 may also be affected by answering questions in one or more quizzes or survey utilized to determine a learning preferences of the user.

For example, a sample question may ask the user to imagine "You have a flat tire on your bike. You would learn how to fix it by: A. Look for a youtube video, or something with diagrams and step-by-step pictures. B. Just jump right in, take off the tire, look for some tools. Learn it by doing it. C. Reading up on Wikipedia or a handy Biking Today article. D. Phone a friend who knows about these things, and have them tell you how."

In one embodiment, the scores 1408 are calculated utilizing a relative-strength score (rather than an absolute score). For example, in four dimensions labeled A, B, C, D representing different kinds of cognitive and media-type preferences, a user with a score of 12A, 11B, 11C, 6D is peers with a user who scores 6A, 4B, 4C, 3D in that A relative to B, relative to C relative to D is the same. As a result, a system may generate the profiles 1400 (and therefore meaningful peer groups) after very few questions or other learning preference influencing actions. In addition, the total number of peer groupings may be reduced compared to typical absolute scoring methods. For example, the standard VARK test with score 0-16 along 4 dimensions requires a user to take a 16 question quiz (generating the 0-16 score per dimension) generating 83,521 distinct peer groups. By converting the meaningful measure to relative strengths, the distinct groups may be reduced to 75, which includes codes for equal dimensions, such as where B=C or A=B=D or so forth. By using smaller number of peer groups in a relative strength system the learning peers 1406, searches may be extended or contracted in search of peer counts with less computation resources.

Every user including guests and members are assigned to one of the profiles 1400. The learning peers 1406 specify how closely aligned the profiles 1400 are to each other. As previously specified, the peer relevance 1402 includes multiple dimensions. The learning preferences 1404 and the learning peers 1406 are utilized to match and map a piece of content (i.e. site, presentation, document, etc.) to the profiles 1400.

In one embodiment, the profiles are created using a learning preference system and method called words, actions, sounds, and pictures (WASP). The four dimensions of preference of WASP may be closely related to media types. There are at least 75 permutations of the dimensions of WASP that may be utilized with equal relative weighting, such as PAWS, SWPA, A(WS)P, (WA)SP, and (PAS)W, to name a few.

The profiles 1400 may be generated after or during interactions with the site, program, or add-on (e.g. http://trails.by) which may include taking an optional quiz. Analysis of the interactions may include semantic and media-type analysis of trails that are rated, created, walked, cloned, and so forth.

In one embodiment, the profiles 1400 may be created using relative strength rather than absolute strength. A user may be assigned to a profile after many different types of interactions rather than only after the user has filled out a mandated questionnaire or survey.

In another embodiment, the profiles 1400 may be compiled using the VARK method. For example, VARK may be a questionnaire that provides users with a profile of their learning preferences. The preferences provide a set of scored dimensions describing the ways that the user wants to take-in (i.e. "learn") and give-out (i.e. "teach") information.

The illustrative embodiments provide a system, method, and executable instructions for creating, managing, and accessing trails. The trails may be generated automatically or based on specific user feedback and instructions. The trails may be navigated randomly or in a sequence to allow accessing users to determine the path or trail that they will make through the provided content. The trails are dynamic and may be accessed via applications, websites, or other communications and computing functionality. The user profiles allow a user to find and create content that corresponds to the cognitive learning and peers that are most closely associated with him or her. The trails may be utilized to share general knowledge, specific processes, training, or other information visually, audibly, and tactilely.

The previous detailed description of a small number of embodiments for implementing the invention and is not intended to be limiting in scope. The following claims set forth a number of the embodiments of the invention disclosed with greater particularity.

What is claimed:

1. A device for generating a trail, the device comprising:
   a processor for executing a set of instructions;
   a memory in communication with the processor for storing the set of instructions, wherein the set of instructions are executed to:
   receive user input from a user to create a trail based on user content generated or retrieved by the user;
   establish a hierarchy for the trail in response to receiving the user input and the user content, wherein the trail includes a plurality of nodes that are interconnected;
   establish characteristics for the plurality of nodes; and
   generate the trail utilizing the hierarchy and the characteristics and according to user preferences established by the user;
   set permissions specified by the user for sharing of the trail;
   receive ratings for the trail; and
   enable viewing of statistics including the ratings associated with the trail.

2. The device of claim 1, wherein the characteristics are enabled to include notes, tags, titles, labels, and descriptions.

3. The device of claim 1, wherein the permissions enable the sharing of only a portion of the trail, the portion of the trail being less than the entire trail.

4. The device of claim 1, wherein sharing of the trail includes posting the trail to Facebook.

5. The device of claim 1, wherein establish characteristics for the plurality of nodes including at least size, shape, and color, wherein the size, shape, and color of a node corresponds to information stored in the node.

6. The device of claim 1, wherein the set of instructions are further executed to:
   recommend trails to the user utilizing a sense map in response to the user performing a search, wherein the sense map maps learning preferences between how the user likes to receive information and how sites offer information.

7. The device of claim 6, wherein the sense map is also defined by analysis of historical interactions of the user.

8. The device of claim 1, wherein the permissions enable the sharing of the trail publicly.

9. The device of claim 1, wherein the set of instructions are further executed to:
   receive scores for one or more trails, requests, users and URLs of search results.

10. A server for generating a trail for a user, the server comprising:
    memory configured to store a set of instructions;
    a processor configured to execute the set of instructions to:
    receive user input by a user to create a trail based on user content generated or retrieved by the user, establish a hierarch for the trail in response to receiving the user input and the user content, the trail includes a plurality of nodes that are interconnected, establish characteristics for the plurality of nodes including at least size, shape and color, wherein the size, shape and color of a node corresponds to information stored in the node, generate the trail utilizing hierarchy and the characteristics and according to user preferences established by the user, and set permissions specified by the user for sharing of the trail, wherein the permissions enable the sharing of only a portion of the trail, the portion of the trail being less than the entire trail; and
    a data storage component configured containing one or more databases for storing a plurality of trails including the trail and the user preferences.

11. The server of claim 10, wherein the server displays the trails to a plurality of users according to user preferences for each of the plurality of trails.

12. The server of claim 10, wherein the processor further executes the set of instructions to recommend trails to the user utilizing a sense map in response to the user performing a search, and wherein the sense map maps learning preferences between how the user likes to receive information and how sites offer information.

13. The server of claim 10, wherein the characteristics are enabled to include notes, tags, titles, labels, and descriptions.

14. The server of claim 10, wherein the processor further executes the set of instructions to receive scores for one or more trails, requests, users and URLs of search results.

15. The server of claim 10, wherein the processor further executes the set of instructions to receive ratings for the trail; and enable viewing of statistics including the ratings associated with the trail.

16. A method for generating a trail, the method comprising:
    receiving user input from a user to create the trail based on user content generated or retrieved by the user;
    establishing a hierarchy for the trail in response to receiving the user input and user content, the trail includes a plurality of nodes that are interconnected;

establishing characteristics for the plurality of nodes including at least shape and color, wherein the shape and color of a node corresponds to information stored in the node;

generating the trail utilizing the hierarchy and the characteristics according to user preferences established by the user;

sharing the trail;

receiving ratings for the trail; and enable viewing of statistics including the ratings associated with the trail.

17. The method according to claim 16, wherein the characteristics are enabled to include notes, tags, tides, labels, and descriptions.

18. The method according to claim 16, further comprising:

recommending trails to the user utilizing a sense map in response to the user performing a search, wherein the sense map maps learning preferences between how the user likes to receive information and how sites offer information.

19. The method according to claim 18, wherein the sense map is also defined by analysis of historical interactions of the user.

20. The method according to claim 16, wherein generating the trail involves utilizing a software as a service (SaaS) model, wherein the software as a service model includes tiers for a number of users.

\* \* \* \* \*